US006985588B1

(12) United States Patent
Glick et al.

(10) Patent No.: US 6,985,588 B1
(45) Date of Patent: Jan. 10, 2006

(54) SYSTEM AND METHOD FOR USING LOCATION IDENTITY TO CONTROL ACCESS TO DIGITAL INFORMATION

(75) Inventors: Barry J. Glick, Washington, DC (US); Ronald S. Karpf, Gaithersburg, MD (US); Mark E. Seiler, Los Angeles, CA (US)

(73) Assignee: Geocodex LLC, Encino, CA (US)

( * ) Notice: Subject to any disclaimer, the term of this patent is extended or adjusted under 35 U.S.C. 154(b) by 945 days.

(21) Appl. No.: 09/699,832

(22) Filed: Oct. 30, 2000

(51) Int. Cl.
*H04L 9/00* (2006.01)

(52) U.S. Cl. .................. 380/258; 380/264; 705/51; 713/163; 713/201

(58) Field of Classification Search ............. 705/51; 711/163; 380/258, 264; 713/163, 201
See application file for complete search history.

(56) References Cited

U.S. PATENT DOCUMENTS

| 4,418,425 A | | 11/1983 | Fennel, Jr. et al. |
| 4,468,793 A | * | 8/1984 | Johnson et al. ............. 375/344 |
| 4,709,266 A | | 11/1987 | Hanas et al. |
| 4,860,352 A | | 8/1989 | Laurance et al. |
| 4,887,296 A | | 12/1989 | Horne |
| 4,993,067 A | | 2/1991 | Leopold |
| 5,243,652 A | | 9/1993 | Teare et al. |
| 5,532,838 A | | 7/1996 | Barbari |
| 5,577,122 A | * | 11/1996 | Schipper et al. .............. 380/28 |
| 5,640,452 A | | 6/1997 | Murphy |
| 5,659,617 A | | 8/1997 | Fischer |
| 5,727,057 A | * | 3/1998 | Emery et al. .......... 379/201.07 |
| 5,740,252 A | | 4/1998 | Minor et al. |
| 5,754,657 A | | 5/1998 | Schipper et al. |
| 5,757,916 A | | 5/1998 | MacDoran et al. |
| 5,790,074 A | | 8/1998 | Rangedahl et al. |
| 5,799,083 A | | 8/1998 | Brothers et al. |
| 5,898,680 A | | 4/1999 | Johnstone et al. |
| 5,915,019 A | | 6/1999 | Ginter et al. |
| 5,920,861 A | | 7/1999 | Hall et al. |

(Continued)

FOREIGN PATENT DOCUMENTS

EP 0 997 808 A 5/2000

(Continued)

*Primary Examiner*—Gilberto Barron, Jr.
*Assistant Examiner*—Jung Kim
(74) *Attorney, Agent, or Firm*—O'Melveny & Myers LLP

(57) ABSTRACT

A method and apparatus for controlling access to digital information utilizes a location identity attribute that defines a specific geographic location. The location identity attribute is associated with the digital information such that the digital information can be accessed only at the specific geographic location. The location identity attribute further includes a location value and a proximity value. The location value corresponds to a location of an intended recipient appliance of the digital information, and may be further defined in terms of latitude, longitude and altitude dimensions. The location identity attribute is enforced by allowing access to the digital information only at the specific geographic location. As a first part of this enforcement process, the location of an appliance through which access to the digital information is sought is identified. The appliance location is then compared to the specific geographic location defined by the location identity attribute, and access to the digital information is allowed only if the appliance location falls within the specific geographic location. There are many ways to identify the location of the appliance, including: (1) resolving the appliance location from a street address for the appliance; (2) retrieving the appliance location from a file stored within the appliance; (3) recovering the appliance location from a GPS receiver embedded in the appliance; and (4) recovering the appliance location by triangulating RF signals received by the appliance.

37 Claims, 9 Drawing Sheets

U.S. PATENT DOCUMENTS

| | | |
|---|---|---|
| 5,922,073 A | 7/1999 | Shimada |
| 5,943,422 A | 8/1999 | Van Wie et al. |
| 5,956,716 A | 9/1999 | Kenner et al. |
| 5,978,747 A | 11/1999 | Craport et al. |
| 5,982,897 A | 11/1999 | Clark |
| 5,987,136 A | 11/1999 | Schipper et al. |
| 5,991,739 A | 11/1999 | Cupps et al. |
| 5,991,876 A | 11/1999 | Johnson et al. |
| 6,003,030 A | 12/1999 | Kenner et al. |
| 6,006,332 A | 12/1999 | Rabne et al. |
| 6,041,411 A | 3/2000 | Wyatt |
| 6,046,689 A | 4/2000 | Newman |
| 6,057,779 A | 5/2000 | Bates |
| 6,070,174 A | 5/2000 | Starek et al. |
| 6,104,815 A | 8/2000 | Alcorn et al. |
| 6,317,500 B1 | 11/2001 | Murphy |
| 6,370,629 B1 * | 4/2002 | Hastings et al. ............ 711/163 |

FOREIGN PATENT DOCUMENTS

| | | |
|---|---|---|
| WO | WO 99 51038 | 10/1999 |
| WO | WO 0027143 | 5/2000 |

* cited by examiner

SYSTEM AND METHOD FOR USING LOCATION IDENTITY TO CONTROL ACCESS TO DIGITAL INFORMATION

BACKGROUND OF THE INVENTION

1. Field of the Invention

The present invention relates to the communication of digital information, and more particularly, to methods and systems for controlling interchange of digital information using a location integrity attribute associated with the digital information.

2. Description of Related Art

Rapid advances in computer, telecommunications and networking technology have enabled an avalanche of new opportunities and applications that were impossible just a few years ago. These advances are exemplified by the explosive growth in popularity of the Internet. As known in the art, the Internet is an interconnection of computer networks that enables computers of all kinds to communicate with each other and share information. Companies, individuals, government agencies, charitable organizations, and academic centers, of all sizes, regularly use the Internet to share information, deliver services, and exchange a wide range of content. The Internet functions as a distributed network of systems that is neither controlled nor managed by any one entity. Physical and logical pathways that facilitate the exchange of information connect these networks to each other.

In spite of the tremendous value that this information access has brought to society, there are also enormous costs associated with the uncontrolled flow of information. One of the most important considerations for a communication system is the control over information security and access. In many cases, a sender of information wants to ensure that the intended recipient can only access the information, and that any other unintended recipients of the information are denied access. This information security and access control is typically provided by an encryption system that converts the information into a secret code for transmission over a public network. In an encryption system, the sender converts the original data, or "plaintext," into a coded equivalent called "ciphertext" using an encryption algorithm. The ciphertext may then be decoded (or decrypted) by the receiver and thereby turned back into plaintext. The encryption algorithm uses a key, which is a binary number that is typically from 40 to 128 bits in length. The greater the number of bits in the key, the more possible key combinations and the longer it would take to break the code. The data is encrypted, or "locked," by combining the bits in the key mathematically with the data bits. At the receiving end, the key is used to "unlock" the code and restore the original data.

There are two cryptographic methods in general use. The first method uses a secret key that is used by both the sender and receiver to encrypt and decrypt the plaintext information. A drawback of this method is that it is hard for the sender to deliver the secret key to the receiver without risking its compromise. The second method is known as public-key cryptography, which uses two keys known as a private and a public key. Each party has a private key that is kept secret and not shared, and a public key that is made publicly available. The public key is used to encrypt the plaintext information, and the private key is used to decrypt the ciphertext message. The private key may not be mathematically derived from the public key. The parties to a communication may exchange their public keys over an unsecured communication channel, such as the Internet, and thereafter use the public keys to encrypt their messages. The receivers then use the private key to decrypt the message.

Another important consideration for a communication system is the prevention of unauthorized copying of copyright-protected digital content. With conventional computing and communication systems, an unscrupulous individual can easily make and distribute an unlimited number of identical copies of a copyrighted work in digital form (e.g., music, literary works, photography, video, software, etc.). Moreover, commercially available file indexing services allow computer users to easily locate and access digital files on other user's computer systems, thereby greatly increasing the potential for widespread copyright piracy. One such service provided by Napster, Inc., of San Mateo, Calif., provides a file sharing application that works in conjunction with Napster's Web site to locate music files in the popular MP3 format residing on other computers currently logged onto the Internet. A similar service known as Gnutella provides a file sharing system that allows users to search for software and documents on the GnutellaNet, a loose federation of users and organizations that make a wide variety of information available to the world at large. Gnutella differs from Napster, which is geared to music files and provides a centralized listing, whereas the GnutellaNet is a peer-to-peer network that contains all kinds of files. While these file sharing systems also have a legitimate purpose in enabling users to share non-copyright-protected files, they are also widely used to obtain copyright-protected files in violation of copyright laws. The illicit use of these file sharing systems represents a serious threat to copyright owners.

Active policing of the Internet is not a viable solution for copyright holders. Such policing efforts are logistically difficult given the widespread and anonymous nature of Internet copyright piracy. In addition, the popular sentiment that information content exchanged on the Internet should be free makes large scale policing efforts very unattractive from a public relations standpoint. To address this problem, various digital rights management (DRM) systems have emerged for protecting the copyrights of digital content that is distributed by focusing on preventative measures. For example, a proposed DRM system for the recording industry known as the Secure Digital Music Initiative (SDMI) sets forth a set of rules for securely distributing digital music over the Internet. SDMI provides guidelines for developing compliant DRM systems, including a container format that software and hardware players must support in order to play back the material. Announced in February 1999, the SDMI is backed by the Recording Industry Association of America (RIAA) and Sony, Warner, BMG, EMI and Universal, the top five music production companies.

Notwithstanding these efforts, DRM systems present at best an incomplete solution for a number of reasons. First, given the availability of pirated content on the Internet, it is far more convenient and inexpensive for a user to unlawfully download a digital file over the Internet than to purchase a legitimate copy of the material via conventional channels of trade. While the unlawfully obtained material may have reduced quality in comparison to the legitimate copy, the convenience and negligible cost often make up for this drawback.

Second, most DRM technologies rely upon some form of encryption to protect the digital information. To be most effective, both parties to an encryption scheme must have a vested interest in maintaining the secrecy of the encrypted information. A legal purchaser of content has a right to view the content, but has no vested interest in ensuring that the secrecy afforded by encryption is maintained. For this reason, many DRM solutions utilize digital certificates or licenses that attempt to hide the decryption key from the user. In such systems, all copies of the content are encrypted in an identical manner, and the media player validates the user's right to display or play back the decrypted content. Since the encrypted content and decryption key are nevertheless accessible to the user albeit hidden, a sophisticated user may reverse engineer the DRM solution to strip away the encryption to thereby permit unimpeded copying and distribution of the decrypted content. Other less sophisticated ways of obtaining an unencrypted copy of the content are also available to unscrupulous users, such as videotaping each frame of a digital video data file as that content is legally displayed during playback.

Accordingly, it would be very desirable to provide a way to control the interchange of digital information that overcomes these and other drawbacks. More particularly, it would be desirable to provide an information interchange system and method that allows control over security and access to the information, and which prevents unauthorized copying of copyright-protected content.

SUMMARY OF THE INVENTION

A method and apparatus for controlling access to digital information in accordance with the present invention utilizes a location identity attribute that defines a specific geographic location. The location identity attribute is associated with the digital information such that the digital information can be accessed only at the specific geographic location. The location identity attribute further includes a location value and a proximity value. The location value corresponds to a location of an intended recipient appliance of the digital information, and may be further defined in terms of latitude, longitude and altitude dimensions. The proximity value corresponds to a zone that encompasses the location. The location identity attribute may further include a temporal value such that the digital information can only be accessed at the specific geographic location and during a particular time period.

According to a general embodiment of the invention, access to the digital information is allowed only at the specific geographic location defined by the location identity attribute. As a first part of this enforcement process, the location of an appliance through which access to the digital information is sought is identified. There are many ways to identify the location of the appliance, including: (1) resolving the appliance location from a street address for the appliance; (2) retrieving the appliance location from a file stored within the appliance; (3) recovering the appliance location from a GPS receiver embedded in the appliance; and (4) recovering the appliance location by triangulating RF signals received by the appliance. After the appliance location is identified, it is compared to the specific geographic location defined by the location identity attribute. Access to the digital information is allowed only if the appliance location falls within the specific geographic location.

In a more specific embodiment of the invention based on the foregoing general embodiment, the digital information is encrypted using an encryption key based at least in part on the location identity attribute. The encryption key may be further based on an area parameter that is determined from the location identity attribute and is included with the encrypted digital information. The area parameter describes a shape of a geographic area, but does not identify where the geographic area is located. The area parameter is deterministically combined with the location identity attribute to yield the encryption key. The appliance that receives the encrypted digital information can generate a decryption key to decrypt the digital information based on the received area parameter and the appliance location determined in accordance with any of the foregoing methods. If the appliance location is not within the proximate area of the location identity attribute, the appliance will be unable to generate a decryption key to decrypt the digital information. Thus, allowing decryption of the digital information only at the specific geographic location enforces the location identity.

In another specific embodiment of the invention based on the foregoing general embodiment, the location identity attribute is integrated with the digital information in a portion of a file containing the digital information. A software application or operating system that accesses the file would enforce the location identity by allowing access to the file only at the specific geographic location defined by the location identity attribute.

In yet another specific embodiment of the invention based on the foregoing general embodiment, the location identity attribute is enforced by a hardware controller associated with hardware element of an appliance, such as a hard disk controller or video controller. The digital information could only be retrieved from memory, or displayed on a video monitor, if the hardware element is located at the specific geographic location defined by the location identity attribute.

A more complete understanding of the system and method for using location identity to control access to digital information will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

Figure 1:
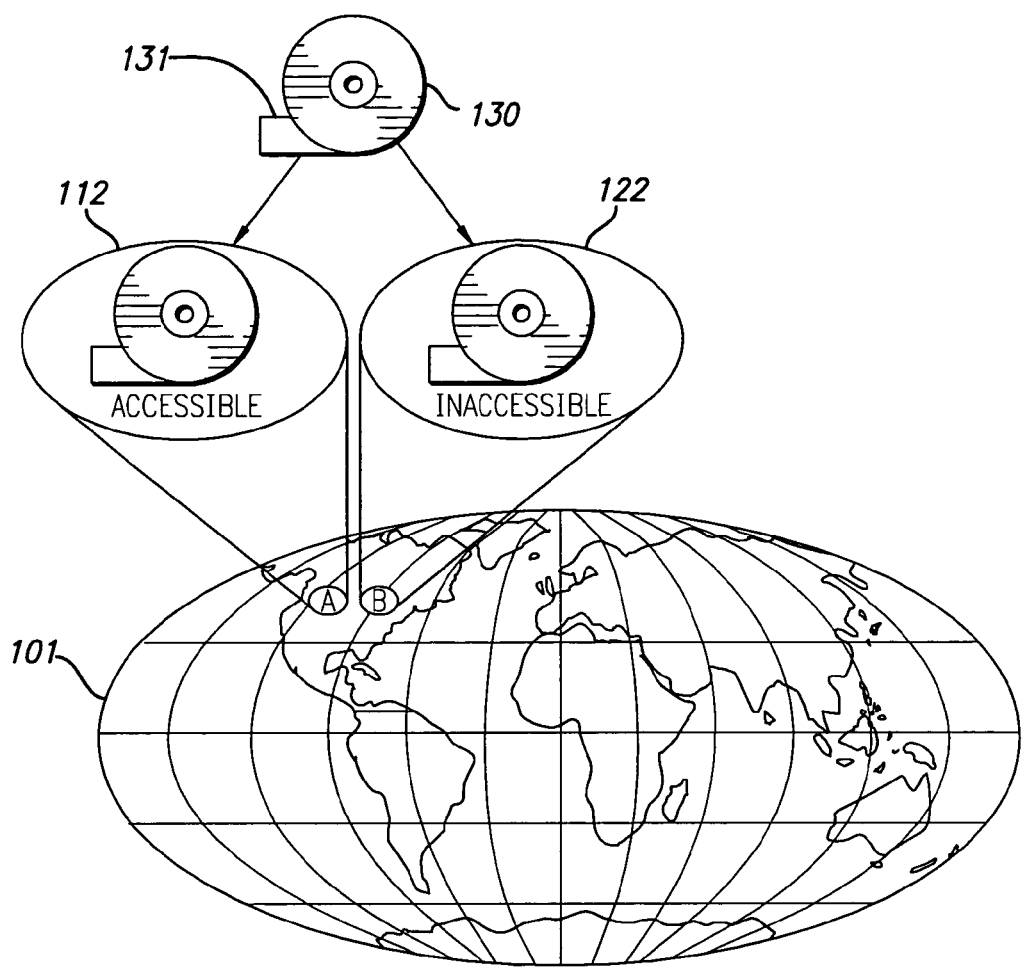
FIG. 1 is a schematic drawing illustrating access to digital information determined by location identity in accordance with an embodiment of the present invention.

The present invention satisfies the need for a way to control the interchange of digital information that allows control over security and access to the information, and which prevents unauthorized copying of copyright-protected content. In the detailed description that follows, like element numerals are used to describe like elements illustrated in one or more of the figures. Various terms are used throughout the detailed description, including the following:

Appliance. Electronic devices, systems, networks, and the like with the minimum capacity to acquire digital information, transmit the information, and acquire location information. These electronic devices will often include a processing capability to execute program instructions and a memory capacity for short term and long term data storage.

Associating Location Identity. The method of marking digital information with a location identity attribute.

Digital Information. Digital information is information that is represented in digital format. Examples of information that can be represented digitally include text, data, software, music, video, graphics, etc.

Enforcing Location Identity. The method of providing or denying access to digital information through its associated location identity attribute.

Geocode. A unique coding of a location on earth usually associated with a coordinate system. Some geocodes identify a point location, such as when a place is identified by its latitude and longitude. Other geocodes may identify a region such as a zip code.

Geolock. An enforced association between digital information and a geographic area defined by a location identity attribute.

Geolocked Information. Digital information that has been associated with a location identity attribute, and that can only be accessed within an area defined by the location identity attribute.

Location. Any geographic place. It may be, but is not limited to, a precise point location, an area or region location, a point location included within a proximate area, or combinations of places on earth. Location can also include height (or altitude) to identify position above or below the surface of the earth, or time to identify position in a temporal dimension.

Location Identity. A precise coding of a location. It can be used, but is not limited to, an attribute of information to precisely define the location at which the information is to be accessed. Location identity may be a coding of a point location, a region, a region with an associated point location, a corridor (i.e., center line with length on either side of the center line), or by any other precise identification of a location in space and time.

Location Variance. The minimum resolution at which a geocode of a location may fail to exactly distinguish it from adjacent locations. For example, if a military grid reference system is used with two characters of precision, then any location is precise to within only ten kilometers.

Playback Location. A location at which playback of digital information will be allowed.

Proximity. The zone or area that includes the location.

The foregoing definitions are not intended to limit the scope of the present invention, but rather are intended to clarify terms that are used in describing the present invention. It should be appreciated that the defined terms may also have other meanings to persons having ordinary skill in the art. These and other terms are used in the detailed description below.

Referring now to FIG. 1, a schematic illustration of the present invention depicts access to digital information determined by location identity. Location identity refers to an attribute of information that precisely determines the geographic area or region in which the information is accessible. Two geographic areas denoted by A and B are shown on a map 101 within the continental United States. Information 130 is represented in digital format, and has an associated location identity attribute 131 which precisely defines the geographic area A as the region in which the digital information can be accessed. If an appliance 112 is located within the geographic region A, then the digital information 130 will be accessible by the appliance. Conversely, if an appliance 122 is located within the geographic region B (or anywhere else besides geographic region A), then the digital information 130 will not be accessible. Location identity thus represents an attribute of digital information that determines the precise geographic region within which the information can be accessed. Digital information that have location identity are termed "geolocked" and systems that enforce location identity geolock the associated digital information to the geographic region defined by the location identity attribute.

Figure 2:
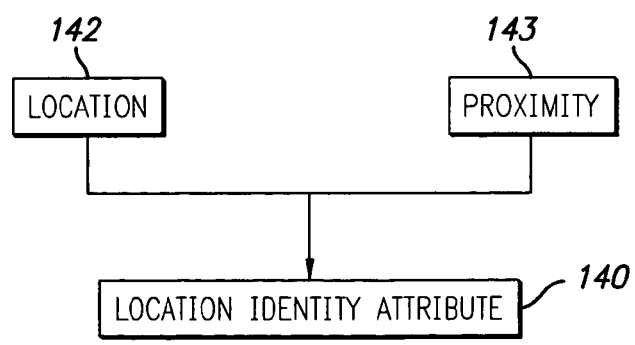
FIG. 2 is a block diagram illustrating components of a location identity attribute.

FIG. 2 depicts a location identity attribute 140 as comprising two items of information: a location value 142, and a proximity value 143. The location value 142 corresponds to the unique position of a particular place. Many different coordinate systems, such as latitude and longitude, have been developed that provide unique numerical identification of any location. For the purposes of this invention, any coordinate system that uniquely identifies a place can be used for the location value 142 of the location identity attribute 140. The proximity value 143 corresponds to the extent of a zone or area that encompasses the location. The location identity attribute 140 may comprise a point location or an exact location if the proximity value 143 is set to zero, null, empty, etc., or some other value indicating that the area referred to by the location identity attribute is a unique point location. It should be appreciated that the proximity value 143 is different from location variance. The proximity value 143 refers to a representation of an area or region, whereas location variance is the minimum resolution at which a geocode or a location may fail to exactly distinguish it from an adjacent location.

Figure 3:
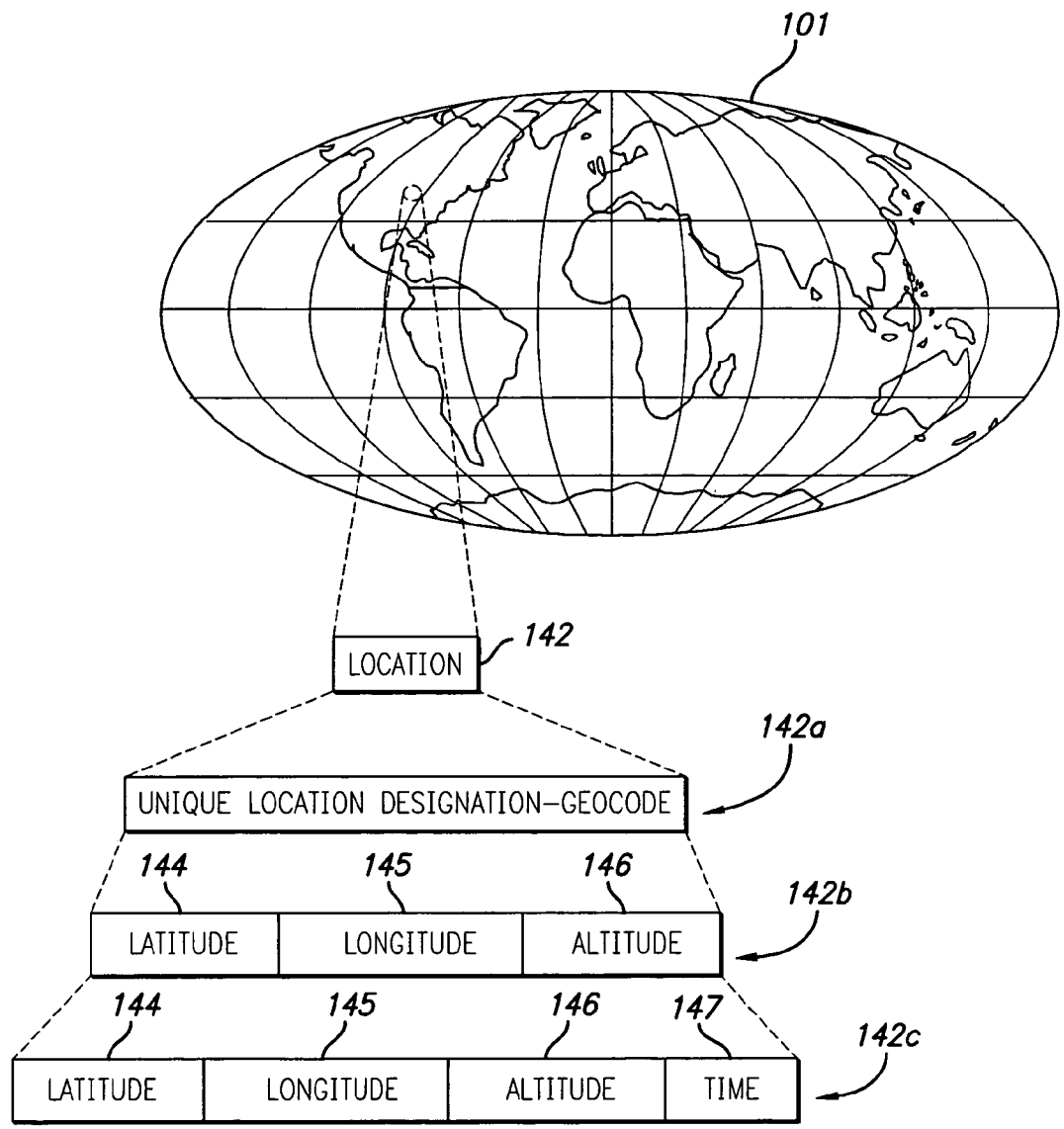
FIG. 3 is a block diagram illustrating components of a location value of the location identity attribute.

FIG. 3 depicts the location value 142 in greater detail. As noted above, there are numerous different coordinate systems in common use that provide a set of numbers that uniquely identify every location within the coordinate system. In the present invention, the location value 142 is defined in terms of a unique location designation or geocode as shown at 142*a*. Latitude 144 and longitude 145 using a conventional coordinate system may then further define the geocode. Other known systems, such as the Earth Centered, Earth Fixed Cartesian coordinate system, Universal Transverse Mercator (UTM), Military Grid Reference System (MGRS), World Geographic Reference System (GEOREF) etc., could also be advantageously utilized. In addition to latitude 144 and longitude 145, the location value could further include an altitude 146 as shown at 142*b*, which corresponds to the height of the location above sea level. Alternatively, the location value could further include a time value 147 that may be defined in terms of a date and/or time range. This allows the definition of location identity to consider both geographic and/or temporal access to information.

Any geographic region or area that contains the location value 142 of the location identity can serve as the proximity value 143 for the location identity attribute 140. The proximity value 143 may comprise a rectangular region defined by two adjacent longitude lines (providing horizontal edges) and two adjacent latitude lines (providing vertical edges). Alternatively, the proximity value 143 may comprise a circular region represented by a single number defining the radius around the location. The circular region can be further defined as an elliptical area either centered at the location, or a circular or elliptical area that contains the location but not necessarily as the centroid. In another alternative, the proximity value 143 may comprise an irregular closed polygon, or a corridor. In yet another alternative, the proximity value 143 may correspond to a known geographic region, such as the country of Brazil. Other types of known geographic regions that can define the proximity value 143 can include postal zip codes, states, counties, incorporated cities, etc.

Figure 4:
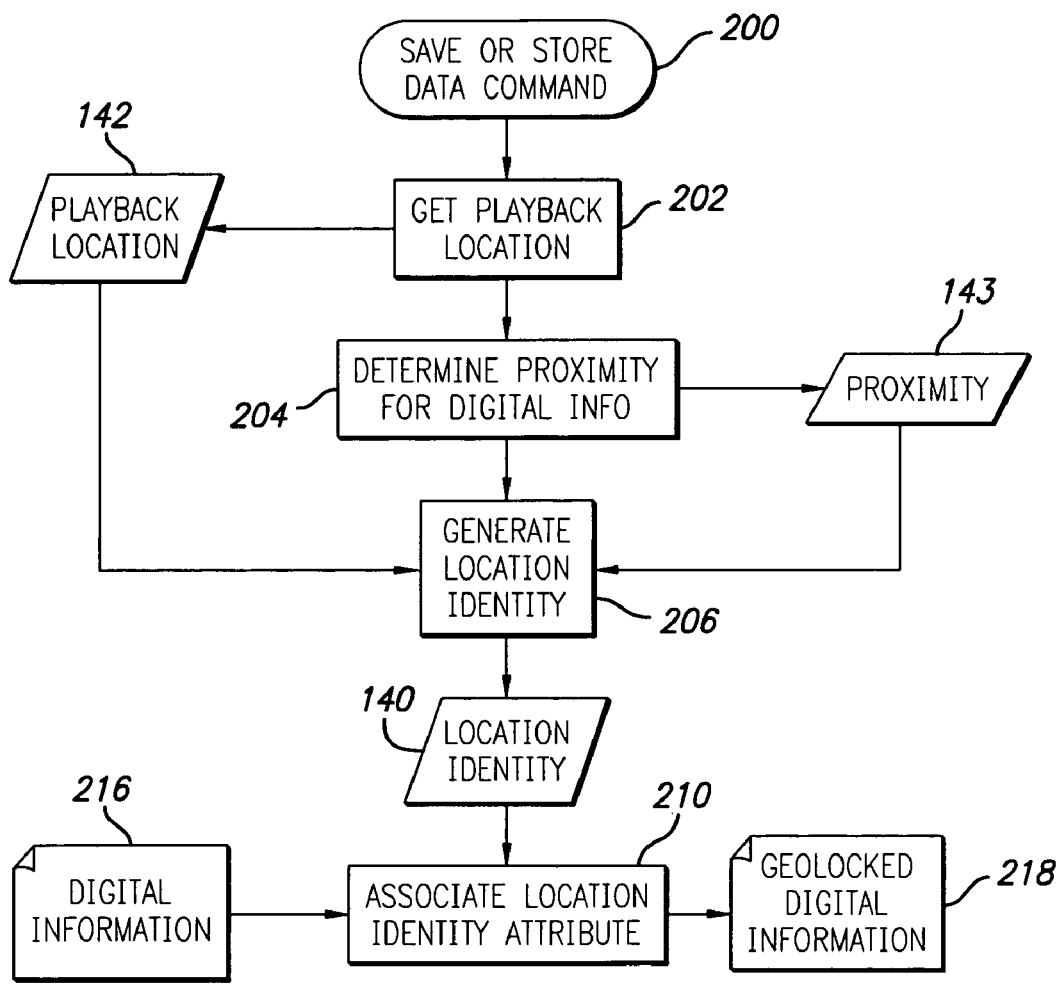
FIG. 4 is a flowchart illustrating a method for associating a location identity attribute with digital information.

In accordance with the invention, whenever digital information is saved, stored, or copied, a location identity attribute 140 is associated with the digital information so that subsequent access of the digital information is limited to the geographic area specified by the location identity attribute 140. FIG. 4 illustrates a general method for associating digital information with the location identity attribute 140 that precisely defines the region in which access or playback of the digital information will be allowed.

It should be appreciated that this method is analogous to the setting of a file attribute, such as a read-only attribute, for a computer file when the file is saved. The method would be performed by a system or device having a data processing capability and memory sufficient to generate, handle or process digital information for communication or distribution to another party, such as a personal computer, server, personal digital assistant (PDA), laptop, workstation, network, and the like. Software or embedded firmware instructions operating on the system or device would cause the method to be performed.

More particularly, the method starts at step 200 with a command to save or store digital information with a location identity attribute. At step 202, a location value 142 for the digital information is retrieved and stored for later use. The location value 142 is not necessarily the geographical location at which the method is invoked on the appliance, but rather corresponds to the location identity attribute (described above) for an appliance at which access to the digital information will be allowed. At step 204, a proximity value 143 of the location identity attribute of the appliance is retrieved and stored for later use. Various methods for generating the location and proximity values 142, 143 will be described in greater detail below. In addition to such methods, the location and proximity values 142, 143 may also be pre-stored and retrieved from memory, or the end user may be queried to provide the information. At step 206, the retrieved location and proximity values 142, 143 are used to generate the location identity attribute 140. Then, at step 210, the digital information 216 is associated with the location identity attribute 140 to provide geolocked digital information 218.

Figure 5:
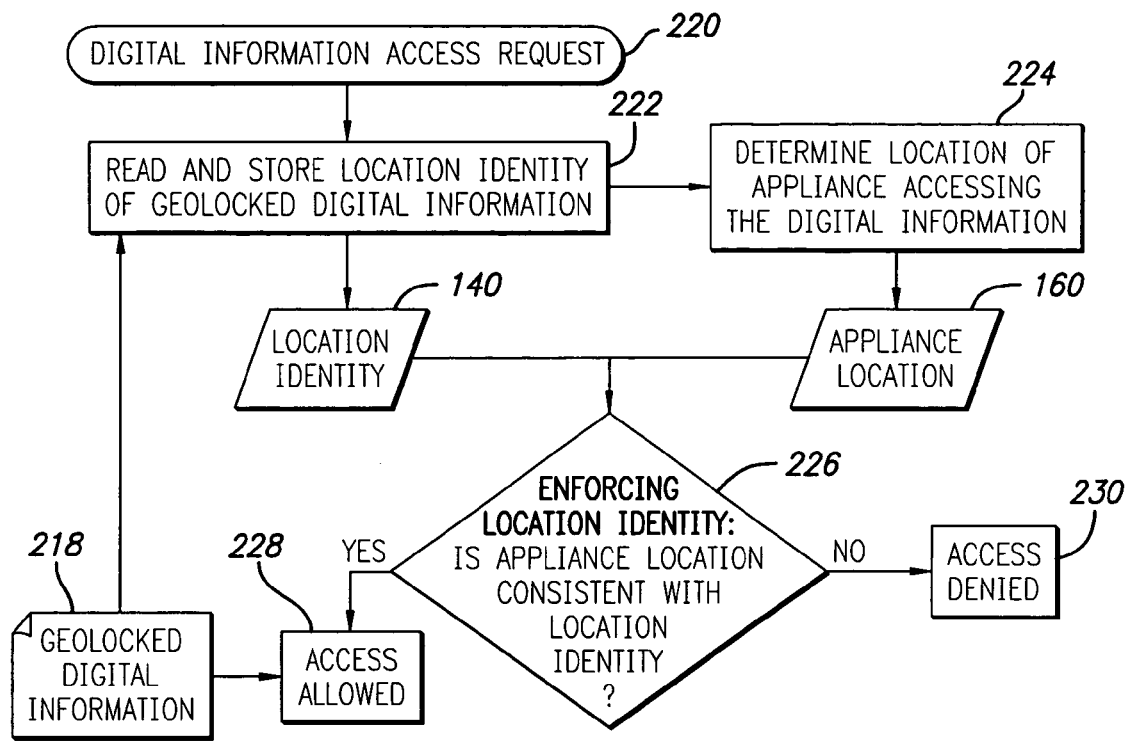
FIG. 5 is a flowchart illustrating a method for enforcing access to geolocked digital information using the location identity attribute.

Attempts to access geolocked information through a read or copy operation performed by a playback appliance will be denied unless the appliance confirms a valid location identity. This is performed by evaluating the associated location identity of the digital information against the location of the playback appliance to determine whether there is a match. FIG. 5 shows a general method for enforcing access to digital information by location identity. Logically, this method is analogous to the way that operating systems currently enforce a read-only attribute on files, i.e., allowing the user to access the file for reading, but denying access for writing. The method would be performed by a system or device having a data processing capability and memory sufficient to enable receipt of digital information communicated or distributed by another party, such as a personal computer, server, router, personal digital assistant (PDA), workstation, network, laptop, and the like. Software or embedded firmware instructions operating on the system or device would cause the method to be performed.

Particularly, the method starts at step 220 with a command to access the digital information. At step 222, the geolocked digital information 218 is accessed to read and store the associated location identity attribute 140. It should be appreciated that only the location identity portion of the geolocked information is accessed, and not the digital information itself. The location identity 140 of the geolocked information is stored for further use in the method. At step 224, the method determines the location of the appliance accessing the digital information. As will be described below, there are numerous possible ways to determine the appliance location 160. The appliance location 160 is stored for further use in the method. At step 226, the method determines whether the location of the appliance is consistent with the region defined by the location identity 140. If the appliance location 160 is consistent with the location identity 140, then access to the geolocked digital information 218 is allowed at step 228. Conversely, if the appliance location 160 is not consistent with the location identity 140, then access is denied at step 230.

FIGS. 6A–6D illustrate a plurality of exemplary methods to determine the playback location of the appliance that seeks access to the geolocked digital information. These methods would be performed by a system as part of the process of enforcing location identity with digital information, as described above with respect to FIG. 4. It should be appreciated that other methods for determining the playback location of the appliance could also be advantageously utilized.

Figure 6A:
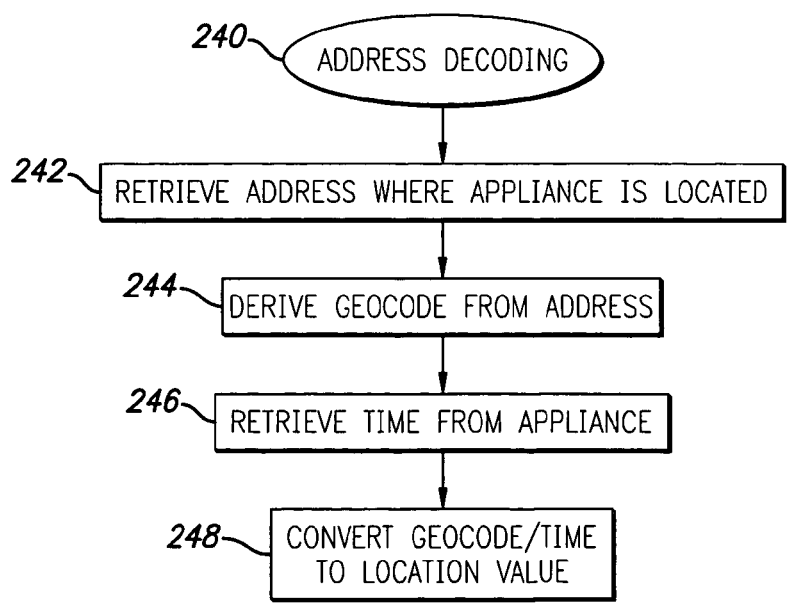
FIGS. 6A–6D are flowcharts illustrating alternative methods for determining location identity for an appliance.

FIG. 6A shows an address decoding method 240 in which a geocode is resolved from the street address for the appliance that will receive the geolocked digital information. At step 242, the address for the appliance is retrieved. The address information may be recalled from memory based on a previous communication with the appliance in which the address was obtained. Alternatively, the appliance may prompt to provide the address information as an initial part of an information transaction. Once the address information is retrieved, the address information is decoded to derive a specific geocode at step 244. This step may utilize a commercially available software program that can generate a coordinate specific geocode from an address, such as the MapMarker OCX Component Version 4.2 from the Mapinfo Corporation located in Troy, N.Y. If it is desired to include a time element with the location identity attribute, then at step 246 the current time would be retrieved from the appliance, such as by reading the time from the appliance system clock. It should be appreciated that this step 246 is optional, and in many applications a time element would not be required. Lastly, at step 248, the geocode and time are converted to a format usable as the location value 142 for the location identity attribute 140.

Figure 6B:
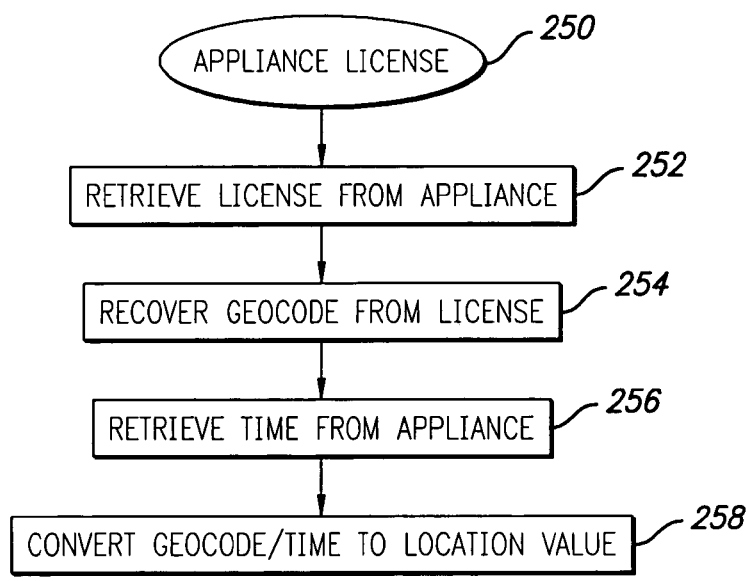

FIG. 6B shows an appliance license method 250 in which the location value is derived from a license stored on the appliance. A license pack is a familiar feature of many systems and is generally used to validate access to application programs. License packs are digital files that contain information regarding the user/licensee. While not unbreakable, they are organized and encrypted in a way that makes them a reliable way of validating the user. In this embodiment of the invention, the license pack would include a coordinate specific geocode identifying the location of the appliance. At step 252, the license pack stored on the appliance is accessed and retrieved. Then, a geocode is recovered from the license at step 254. If it is desired to include a time element with the location identity attribute, then at step 256 the current time would be retrieved from the appliance, such as by reading the time from the appliance system clock. It should be appreciated that this step 256 is optional, and in many applications a time element would not be required. Lastly, at step 258, the geocode and time are converted to a format usable as the location value 142 for the location identity attribute 140.

Figure 6C:
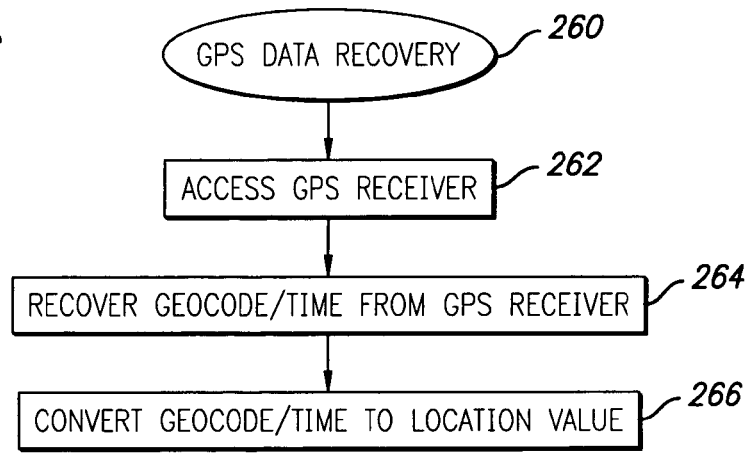

FIG. 6C shows a GPS data recovery method 260 in which the location value is recovered from a GPS receiver embedded in the appliance. As known in the art, the Global Positioning System (GPS) is a satellite-based radio-navigation system developed and operated by the U.S. Department of Defense. GPS permits land, sea, and airborne users to determine their three-dimensional position, velocity, and time, twenty-four hours a day in all weather, anywhere in the world. The GPS system provides civilian users with an accuracy of less than one hundred meters, while military users have an even greater degree of accuracy. The GPS position information is based on a system of coordinates called the World Geodetic System 1984 (WGS 84), and is similar to the latitude and longitude coordinate system. The commercial availability of GPS receivers is increasingly common, and in this embodiment it is anticipated that the appliance include an embedded GPS receiver. For example, GPS receivers are available as PCMCIA cards such as the NavCard made by the Rockwell Corporation or the GPScard from Trimble Navigation, and the Novalel Corporation makes a GPS receiver for a general purpose IBM PC. At step 262, the GPS receiver embedded in the appliance is accessed. A geocode is recovered from the embedded GPS receiver at step 264. Optionally, a time value may also be recovered from the GPS receiver. Lastly, at step 266, the geocode and optional time value are converted to a format usable as the location value 142 for the location identity attribute 140.

Figure 6D:
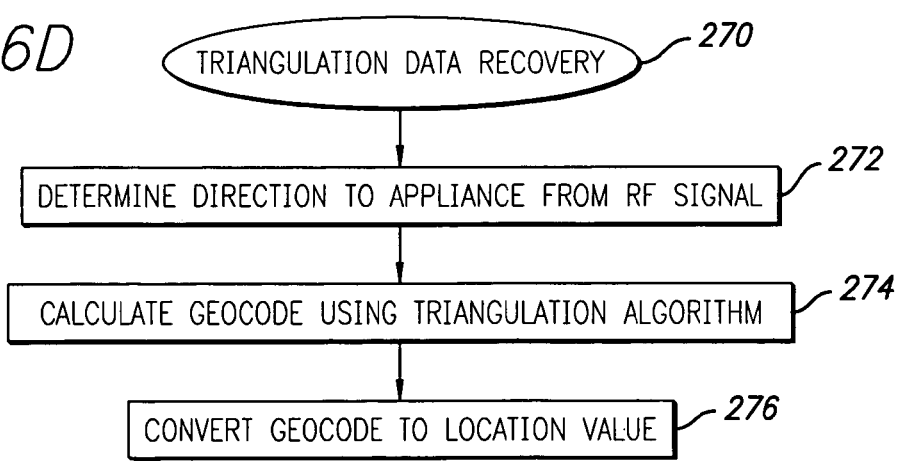

FIG. 6D shows a triangulation data recovery method 270 to determine the location of the appliance. As known in the art, triangulation is a method often employed by satellites, cellular phones, navigational systems, and other radio signal operators to provide accurate position information. The Loran-C System is an example of a commercially available navigation system that provides location information by triangulating RF signals from a plurality of fixed position RF transmitters. At step 272, the system will determine the direction to the appliance by accessing a RF signal communicated by the appliance. A geocode is calculated from the RF signal using a triangulation algorithm at step 274. Lastly, at step 276, the geocode is converted to a format usable as the location value 142 for the location identity attribute 140. If a time element is needed in the location identity attribute 140, then the current time would be read from the appliance system clock in the same manner as described above.

Figure 7:
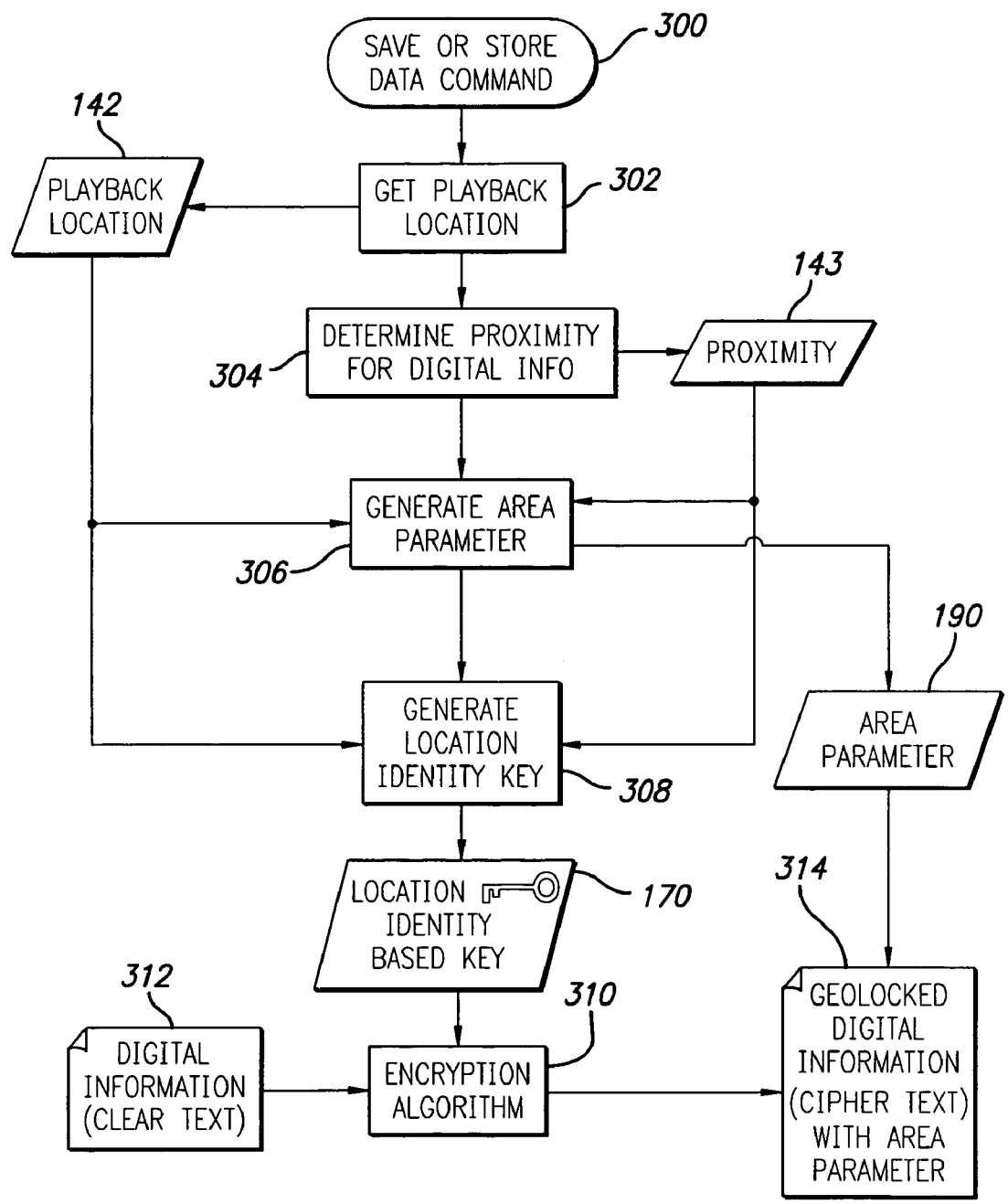
FIG. 7 is a flowchart illustrating an encryption method for associating a location identity attribute with digital information.

In accordance with an embodiment of the invention, the digital information is encrypted before transfer to an appliance and the location identity attribute 140 is used to generate a location identity based key used to encrypt the digital information. The layer of encryption added to the digital information enforces the limitation on access defined by the location identity attribute 140. FIG. 7 illustrates an encryption method for associating digital information with the location identity attribute 140. The method starts at step 300 with a command to save or store digital information with a location identity attribute. At step 302, a location value 142 for the digital information is retrieved and stored for later use. At step 304, a proximity value 143 of the location identity attribute of the appliance is retrieved and stored for later use. At step 306, the location and proximity values 142, 143 are used to generate an area parameter 190 that defines a shape of the geographic region defined by the location and proximity values, but which does not identify the location. The area parameter 190 may correspond to the proximity value 143. The location and proximity values 143 are used to generate a cryptographic location identity key 170 at step 308. Then, at step 310, the digital information 312 in cleartext form is deterministically combined with the location identity key 170 by an encryption algorithm to provide encrypted geolocked digital information 314 in ciphertext form. This way, the cleartext would be encrypted based on the location identity key 170, such that the location identity attribute is cryptographically integrated with the digital information. The area parameter 190 would also be attached to the geoplocked digital information 314 in cleartext form. It should be appreciated that other methods of generating the area parameter 190 may be utilized, as long as the area parameter alone is insufficient to generate the location identity key, but only when combined with the location of the appliance produces the location identity key.

Figure 8:
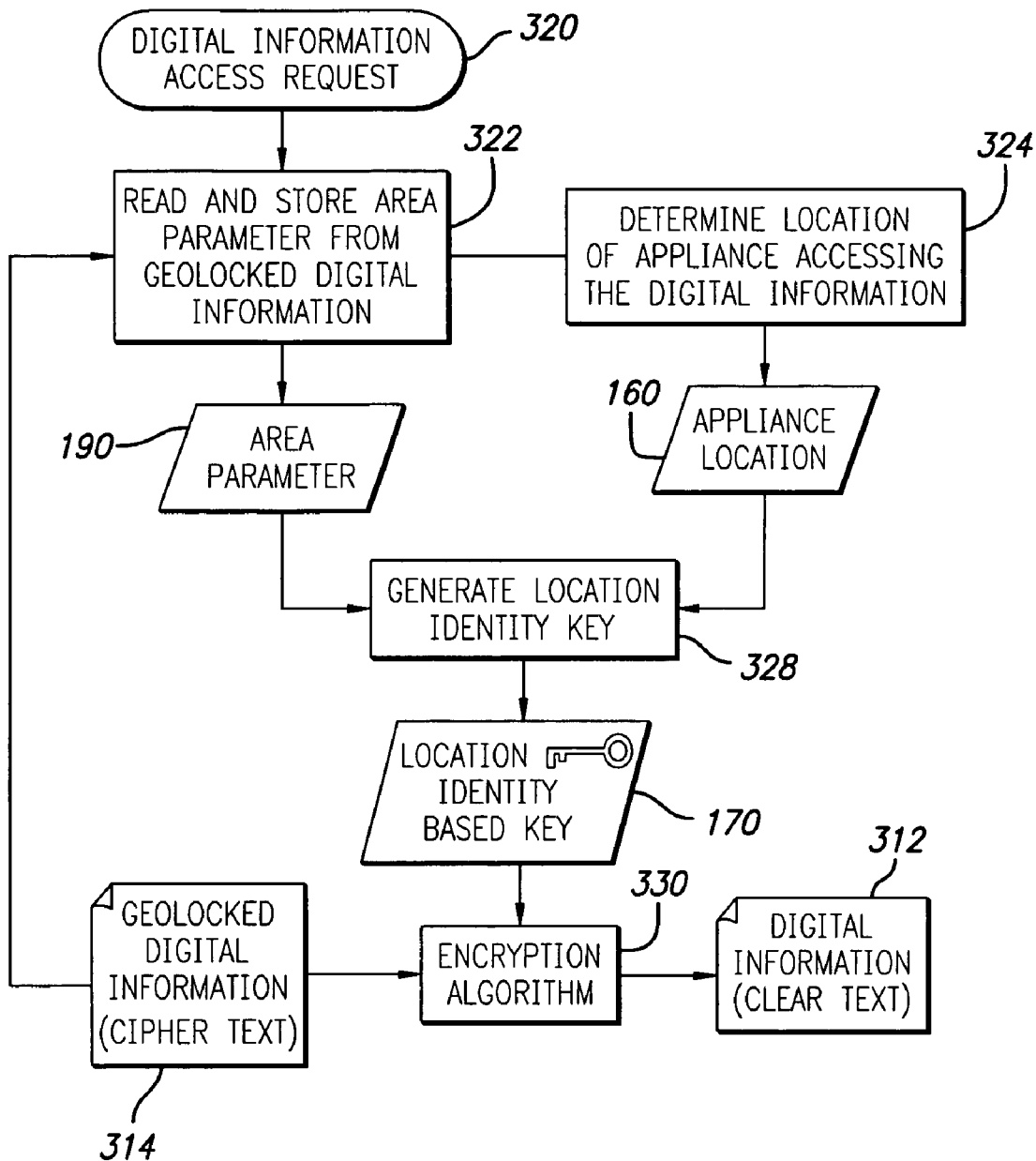
FIG. 8 is a flowchart illustrating an encryption method for enforcing access to geolocked digital information using the location identity attribute.

Attempts to access the encrypted geolocked information through a read or copy operation performed by a playback appliance will be denied unless the appliance enforces the location identity. FIG. 8 shows a method for enforcing access to digital information by cryptographic location identity. The method starts at step 320 with a command to access the digital information. At step 322, the encrypted geolocked digital information 314 is accessed to recover the area parameter 190. It should be appreciated that at this point only the area parameter 190 is accessed, but not the encrypted geolocked information. At step 324, the method determines the location of the appliance accessing the digital information, such as using one of the methods described above. The appliance location 160 is stored for further use in the method. The method proceeds to step 328 in which the appliance location 160 is combined with the area parameter 190 to generate a cryptographic location identity key 170. It should be appreciated that the cryptographic location identity key 170 generated in step 328 will match the cryptographic location identity key generated previously in step 308 (see above) only if the appliance location 160 is within the region defined by the location identity attribute. The cryptographic location identity key 170 is then used in an encryption algorithm in step 330 to decrypt the geolocked digital information 314 and produce the cleartext digital information 312. It is noted that this method is not dependent upon any particular type of encryption algorithm and could be adapted for use with any known encryption method, including secret key encryption and public key encryption.

In another embodiment of the invention, the location identity attribute 140 is associated with a file containing digital information by an application or operating system of an appliance so that subsequent access of the digital information by the application or operating system is limited to the geographic area specified by the location identity attribute 140. Unlike the embodiment of FIG. 4 (described above) which was directed primarily to the communication of digital information between parties, this embodiment is most applicable to the management of data files by an application program or operating system executing on an individual appliance or a network of appliances. Particularly, this method is directed to the inclusion of a location identity attribute with a file (e.g., in the file header) which is used by an application program such as a word processing program, e-mail client or database manager to determine access to the file. It should be appreciated that an operating system could incorporate the present method into drivers that control basic system file operations, including save, store, copy, delete, and read commands. This is analogous to the way file attributes, such as read/write attributes, are handled in UNIX, Windows and VAX/DCL operating systems.

Figure 9:
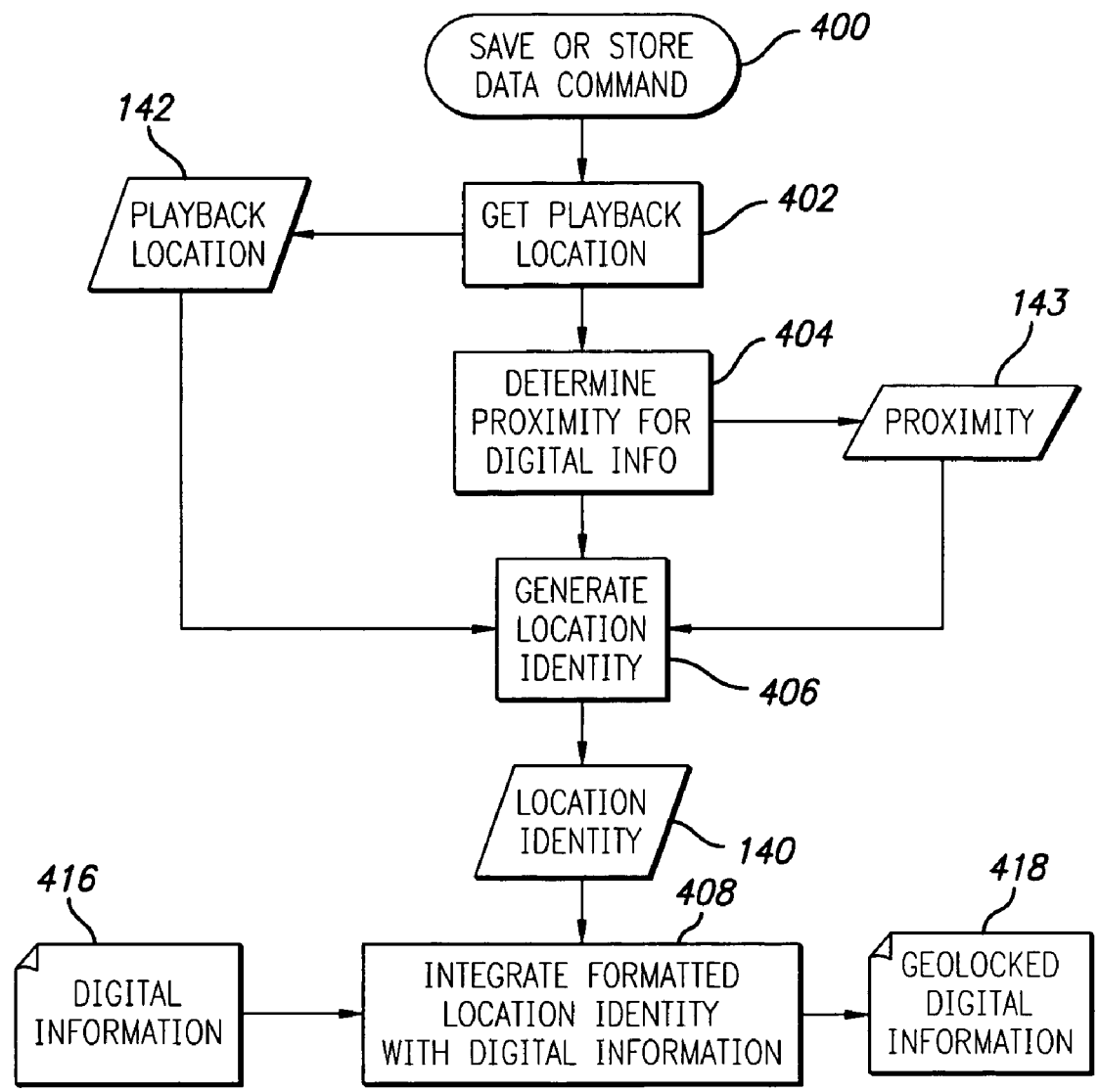
FIG. 9 is a flowchart illustrating a file method for associating a location identity attribute with digital information.

FIG. 9 illustrates a file method for associating digital information with the location identity attribute 140 that precisely defines the region in which access of a digital information file by an application or operating system will be allowed. The method starts at step 400 with a command to save or store a file containing digital information with a location identity attribute. This command may be performed as part of the ordinary operation of an application or operating system. At step 402, a location value 142 for the digital information is retrieved and stored for later use. At step 404, a proximity value 143 of the location identity attribute of the appliance is retrieved and stored for later use. As described above, various methods for generating the location and proximity values 142, 143 may be utilized. At step 406, the retrieved location and proximity values 142, 143 are used to generate the location identity attribute 140. Then, at step 408, the digital information 416 is integrated with the location identity attribute 140 to provide geolocked digital information 418. There are many ways in which to integrate the digital information 416 with the associated location identity attribute 140. For digital information 416 stored as a file, the location identity can be formatted and appended to the front of the digital information file, such as in a header. Alternatively, the location identity attribute 140 can be saved in an associated directory file. In either case, an application or operating system attempting to access the digital information file will enforce location identity by determining whether the location identity attribute 140 allows access to the geolocked digital information.

Figure 10:
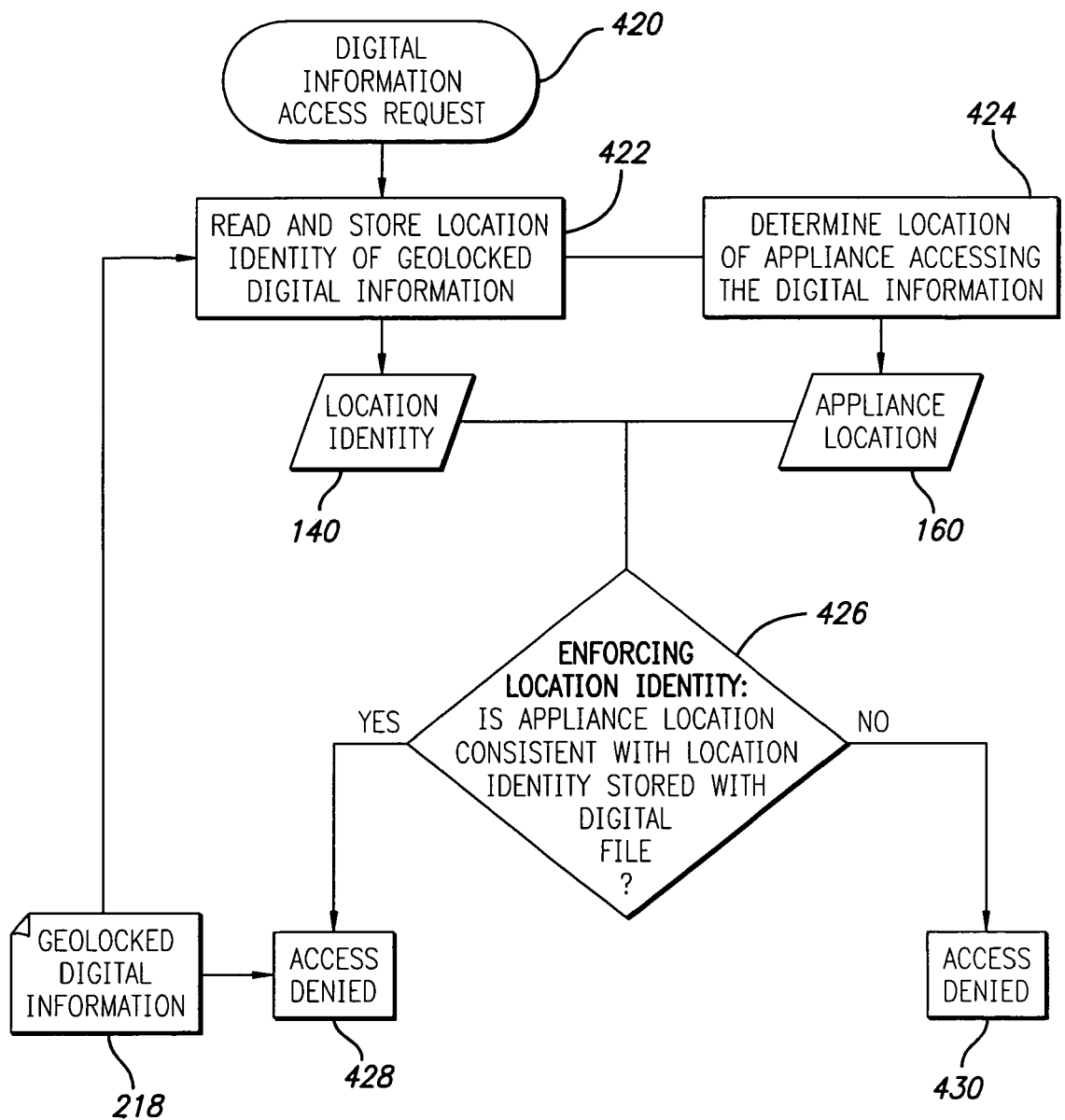
FIG. 10 is a flow chart illustrating a file method for enforcing access to geolocked digital information using the location identity attribute.

Attempts to access geolocked information through a read or copy operation performed by an application or operating system executing on the appliance will be denied unless the appliance complies with the location identity. FIG. 10 shows a file method for enforcing access to geolocked digital information by location identity. The method starts at step 420 with a command to access the geolocked digital information. At step 422, the geolocked digital information 218 is accessed to recover the associated location identity attribute 140. It should be appreciated that only the location identity portion of the geolocked information is accessed, and not the digital information itself. At step 424, the method determines the location of the appliance accessing the digital information. As described above, there are numerous possible ways to determine the appliance location 160. The appliance location 160 is stored for further use in the method. At step 426, the method determines whether the location of the appliance is consistent with the region defined by the location identity 140. If the appliance location 160 is consistent with the location identity 140, then the application or operating system can access the geolocked digital information 218 at step 428. Conversely, if the appliance location 160 is not consistent with the location identity 140, then access is denied at step 430. Since access to the geolocked digital information can only be achieved through an application or through the operating system, the application or operating system will be able to robustly enforce access to the geolocked digital information.

In yet another embodiment of the invention, the method for associating digital information with the location identity attribute 140 can be implemented in a hardware controller for an appliance. Every hardware device for an appliance (e.g., hard disk, DVD/CD-ROM, floppy disk, video display, etc.), has a corresponding hardware controller that performs a limited set of functions with the device in response to specific commands from a software operating system. As in the preceding embodiments, digital information is saved in association with a corresponding location identity attribute. Any attempt to read the digital information through a device level command will be carried out by the device hardware controller with respect to the location of the playback appliance and the location identity stored on the device.

Specifically, the hardware controller may be adapted to execute some or all aspects of the aforementioned methods, including steps 202–210 of the general method described above with respect to FIG. 4, and steps 222–230 of the general method described above with respect to FIG. 5. For example, a hard disk controller for a personal computer may be coded to implement the foregoing method such that every digital information file that is stored in the hard disk has a location identity attribute stored therewith or as part of a file directory. The device hardware controller may further include an integrated GPS receiver that can provide the device hardware controller with location and temporal information. As before, attempts to access the stored file will be blocked by the hardware controller unless the appliance location matches the location identity attribute. Similarly, a video controller may be coded to block display of a file unless the appliance location matches the location identity attribute.

There are numerous applications and data formats in which the location identity attribute can be used to control access to digital information. A user can receive geolocked digital information in electronic form using any conventional method, including via telephone line, fiber optic, cable television, satellite broadcast, wireless or other media. A user may also physically receive custom generated geolocked digital information from a store or vendor in the form of magnetic or other encoded media, e.g., CD-ROM, diskette, videocassette or tape. Similarly, geolocked digital information can be communicated over a network including wide area networks such as the Internet, local networks such as intranets, dial-up access between a personal and server computers, as an attachment to e-mail, or through a digital cell phone or other wireless device. Geolocked digital information can be stored on diskette, CD-ROM, tape, fixed or removable hard disk, DVD/CD-ROMs, flash memory/disks, EEPROMs, etc. The types of digital information that can be protected in this matter can include music files (e.g., MP3), software, literary works, commercial transaction files, text files, video/graphics, paging messages, cell phone conversation and commerce, and digital film, to name a few.

In an exemplary application of the present invention, the location identity attribute may be used to combat the problem of piracy and unauthorized use and copying of digital film. A customer would rent or buy digital video media (e.g., DVD) in a manner analogous to that when renting or purchasing film at a commercial video rental store. The location identity attribute is utilized at the time of purchase of the digital video media. Specifically, the location identity attribute corresponding to the customer's home address would be physically stored on a re-writable portion of the digital video media. The DVD player in the customer's home will be coded to enforce the location identity attribute in order to limit the playback of the digital video media to the particular geographic region and time period. Even if the media is copied, lost or stolen, it can only be viewed within its playback region and time span, and thus serves as a robust solution to the problems associated with unauthorized use of digital media.

In another exemplary application, a customer orders digital film or audio through a vendor's catalog. The catalog may be hardcopy or Internet-based, and the order may be placed via postal mail, telephone, facsimile transmission or Internet-based transaction. By whatever method the order is placed, the customer's order indicates the playback location. When the order is filled by the vendor, the location identity attribute associated with the customer is determined and used to generate an encryption key which is then used to encrypt the digital information file for the media. The purchased media is then custom encrypted for the order, copied to a format such as DVD or CD-ROM, and packaged with a viewer that is also customized for the location identity attribute. Even if the entire contents of the purchased media are copied, the viewer and media, customized with the location identity attribute, prevent viewing except in the allowable region. In this exemplary application, the use of location identity and customized encryption and viewers provides a robust solution to the problem of piracy and unauthorized use and copying of digital media.

In another exemplary application of the invention, location identity is used to "narrowcast" information over public networks. Narrowcasting refers to the transmission of information to a limited audience (in contrast with broadcasting whereby information is transmitted to a large audience). Many types of information are useable only within a location context, e.g., local weather, traffic information, movie schedules, store information, etc. Applications that use such location-dependent information may be referred to as location-based applications. Location identity provides a way to use a broadcast type protocol to send information over a network that is identified by the location for which it is pertinent, e.g., local area for weather, store location for sale and advertising information, etc. Using the location of the client appliance, the client applications can utilize the location identity attached to the information to screen information selectively based on their current location. It can also provide a way to establish a unique location-based shared cryptographic key to maintain secure confidential communications for geographically limited narrowcast applications.

In another exemplary application of the present invention, location identity is used to enhance confidentiality and security for wireless network connectivity. Wireless networking is coming of age with the advent of networking equipment and protocols such as the "Bluetooth" technology that allows wireless portable or workstations to connect to a network. "Bluetooth" is an open standard for short-range transmission of digital voice and data between mobile devices (e.g., laptops, PDAs, cellular telephones) and desktop devices that supports point-to-point and multipoint applications. Since every wireless appliance communicating over the network will have a unique location, location identity can be utilized to establish a unique shared cryptographic key that can be used to maintain secure confidential communications for wireless devices connecting over a public network.

In still another exemplary application of the present invention, location identity is used to enhance confidentiality and security for users of web applications. Internet "cookies" provide a way to allow web applications to maintain state between separate web pages, and are widely implemented by allowing the server to set and store name/value pairs on the user's computer. A server delivers a cookie to the user computer containing a unique state identifier that is established and shared by the client and server. Allowing the server to set and store information on a user's computer, however, has raised confidentiality and security concerns. The present invention provides a new way to enhance confidentiality and security by allowing the client application to generate the unique state identifier, which can be shared with the server, and used to maintain state for a web-based application.

In each of the foregoing embodiments and exemplary applications, there are at least four logical boundaries that exist between the application program that accesses geolocked digital information and the peripheral and network environment in which these applications operate. These boundaries include: (1) the data acquisition/appliance boundary; (2) the storage/appliance boundary; (3) the user interface/appliance boundary; and (4) the appliance/acquiring location boundary. The data acquisition/appliance boundary refers to the enforcement of location identity at the point of acquisition of digital information by an appliance, e.g., the appliance that cannot acquire the digital information from another source unless the location identity attribute is satisfied. The storage/appliance boundary refers to the enforcement of location identity at the point of storage of digital information by an appliance, e.g., the appliance cannot recall a stored file from memory unless the location identity attribute is satisfied. The user interface/appliance boundary refers to the enforcement of location identity at the point of presenting the information to the user, e.g., the user cannot view the digital information on the monitor of the appliance unless the location identity attribute is satisfied. The appliance/acquiring location boundary refers to the limitations upon access to geolocked data by validating the appliance location, e.g., the user cannot view, store, retrieve or otherwise utilize the digital information in any manner unless the appliance location is acquired using an embedded GPS receiver. It should be appreciated that the relative security provided by any particular implementation of the present invention is related to the boundary at which access control is enforced.

Having thus described a preferred embodiment of a system and method for using location identity to control access to digital information, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A system for controlling access to digital information, comprising:
   a first information processing device adapted to process digital information for access only at a specific geographic location, the first information processing device including a processor having suitable memory adapted to store software instructions operable to cause said processor to perform the functions of:

retrieving a location value that identifies a specific geographic location at which access to digital information is authorized;

generating an area parameter defining a shape of the specific geographic location without identifying the specific geographic location;

combining the location value and the area parameter to provide a first location identity key;

encrypting the digital information using the first location identity key;

sending the area parameter and the encrypted digital information; and a second information processing device adapted to access the encrypted digital information, the second information processing device including a processor having suitable memory adapted to store software instructions operable to cause said processor to perform the functions of:

receiving the area parameter and the encrypted digital information;

determining a current location of the second information processing device;

combining the current location and the area parameter to generate a second location identity key; and decrypting the digital information using the second location identity key.

2. The system of claim 1, wherein the retrieving function performed by the first information processing device further comprises retrieving a proximity value defining a zone that encompasses the specific geographic location.

3. The system of claim 2, wherein the zone comprises at least one of a rectangular region, a polygonal region, a circular region, and an elliptical region.

4. The system of claim 2, wherein the zone comprises at least one of a postal zip code, a state, a city, a county, a telephone area code, and a country.

5. The system of claim 1, wherein the retrieving function performed by the first information processing device further comprises retrieving a temporal value.

6. The system of claim 1, wherein the location value further defines latitude and longitude measurements for the specific geographic location.

7. The system of claim 1, wherein the location value further defines an altitude measurement for the specific geographic location.

8. The system of claim 1, wherein the location determining function performed by the second information processing device further comprises resolving the location from a street address for the second information processing device.

9. The system of claim 1, wherein the location determining function performed by the second information processing device further comprises retrieving the location from a file stored within the memory of the second information processing device.

10. The system of claim 1, wherein the second information processing device further comprises a GPS receiver, and wherein the location determining function performed by the second information processing device further comprises recovering the location from the GPS receiver.

11. The system of claim 1, wherein the location determining function performed by the second information processing device further comprises recovering the location by triangulating RF signals received by the second information processing device.

12. The system of claim 1, wherein the second information processing device further performs the function of allowing access to the digital information by a software application only at the specific geographic location.

13. The system of claim 1, wherein the second information processing device further performs the function of allowing retrieval of the digital information from the memory only at the specific geographic location.

14. The system of claim 1, wherein the second information processing device further performs the function of allowing visual display of the digital information only at the specific geographic location.

15. The system of claim 1, wherein the first information processing device further performs the function of appending the area parameter to the encrypted digital information.

16. The system of claim 15, wherein the receiving function performed by the second information processing device further comprises recovering the appended area parameter.

17. The system of claim 1, wherein the receiving function performed by the second information processing device further comprises receiving the area parameter and encrypted digital information from the first information processing device.

18. The system of claim 1, wherein the first information processing device further performs the function of communicating the area parameter and the encrypted digital information to the second information processing device.

19. An information processing device, comprising:

a processor having suitable memory adapted to store software instructions operable to cause the processor to perform the functions of:

retrieving a location value that identifies a specific geographic location at which access to digital information is authorized;

generating an area parameter defining a shape of the specific geographic location without identifying the specific geographic location;

combining the location value and the area parameter to provide a first location identity key;

encrypting the digital information using the first location identity key; and sending the area parameter and the encrypted digital information to a recipient device, wherein the encrypted digital information can only be decrypted by the recipient device located at the specific geographic location and having access to the area parameter.

20. The information processing device of claim 19, wherein the retrieving function further comprises retrieving a proximity value defining a zone that encompasses the specific geographic location.

21. The information processing device of claim 20, wherein the zone comprises at least one of a rectangular region, a polygonal region, a circular region, and an elliptical region.

22. The information processing device of claim 20, wherein the zone comprises at least one of a postal zip code, a state, a city, a county, a telephone area code, and a country.

23. The information processing device of claim 19, wherein the retrieving function further comprises retrieving a temporal value.

24. The information processing device of claim 19, wherein the location value further defines latitude and longitude measurements for the specific geographic location.

25. The information processing device of claim 19, wherein the processor further performs the function of communicating the encrypted digital information to a recipient device.

26. The information processing device of claim 25, wherein the processor further performs the function of appending the area parameter to the encrypted digital information prior to performing the communicating function.

27. The information processing device of claim 19, wherein the processor further performs the function of storing the encrypted digital information on a suitable storage medium.

28. An information processing device, comprising:
a processor having suitable memory adapted to store software instructions operable to cause the processor to perform the functions of:
receiving digital information that has been encrypted using a location identity key comprising a location value defining a specific geographic location combined with an area parameter defining a shape of the specific geographic location without identifying the specific geographic location;
receiving the area parameter;
determining a current location of the information processing device;
combining the current location and the area parameter to generate a second location identity key; and
decrypting the digital information using the second location identity key, wherein the digital information can only be decrypted if the information processing device is located at the specific geographic location.

29. The information processing device of claim 28, wherein the location value further defines latitude and longitude measurements for the specific geographic location.

30. The information processing device of claim 28, wherein the location value further defines an altitude measurement for the specific geographic location.

31. The information processing device of claim 28, wherein the location determining function further comprises resolving the location from a street address for the information processing device.

32. The information processing device of claim 28, wherein the location determining function further comprises retrieving the location from a file stored within the memory of the information processing device.

33. The information processing device of claim 28, further comprising a GPS receiver, and wherein the location determining function further comprises recovering the location from the GPS receiver.

34. The information processing device of claim 28, wherein the location determining function further comprises recovering the location by triangulating RF signals received by the information processing device.

35. The information processing device of claim 28, wherein the processor further performs the function of allowing access to the digital information by a software application executed by the processor only at the specific geographic location.

36. The information processing device of claim 28, wherein the processor further performs the function of allowing retrieval of the digital information from the memory only at the specific geographic location.

37. The information processing device of claim 28, further comprising a visual display monitor operatively coupled to the processor, and wherein the processor further performs the function of allowing visual display of the digital information on the visual display monitor only at the specific geographic location.

* * * * *